(12) United States Patent
Gibson et al.

(10) Patent No.: US 7,994,653 B2
(45) Date of Patent: Aug. 9, 2011

(54) PLUGGABLE POWER MANAGEMENT MODULE FOR A POWER DISTRIBUTION PANEL

(75) Inventors: Keith Gibson, Richardson, TX (US); Roy Davis, Rowlett, TX (US); Michael Steeves, Garland, TX (US)

(73) Assignee: Lineage Power Corporation, Mesquite, TX (US)

( * ) Notice: Subject to any disclaimer, the term of this patent is extended or adjusted under 35 U.S.C. 154(b) by 357 days.

(21) Appl. No.: 12/406,687

(22) Filed: Mar. 18, 2009

(65) Prior Publication Data

US 2010/0237699 A1 Sep. 23, 2010

(51) Int. Cl.
*H02J 3/06* (2006.01)
(52) U.S. Cl. .......................................................... 307/29
(58) Field of Classification Search .................. 307/11, 307/18, 29; 361/600, 785, 796, 679.32, 679.4; 710/100
See application file for complete search history.

(56) References Cited

U.S. PATENT DOCUMENTS

| | | | | |
|---|---|---|---|---|
| 3,925,710 | A * | 12/1975 | Ebert | 361/690 |
| 5,444,966 | A * | 8/1995 | Strosser et al. | 56/10.2 J |
| 6,002,563 | A * | 12/1999 | Esakoff et al. | 361/87 |
| 6,358,099 | B1 | 3/2002 | Kolody et al. | |
| 7,353,097 | B2 * | 4/2008 | Bale et al. | 701/37 |
| 7,609,973 | B2 * | 10/2009 | Rossi et al. | 398/135 |
| 7,805,622 | B2 * | 9/2010 | Wang et al. | 713/300 |

* cited by examiner

*Primary Examiner* — Albert W Paladini

(57) ABSTRACT

One aspect provides a pluggable power management module, comprising a module housing having input and output pluggable connectors extending therefrom configured to be couplable to a corresponding input and output terminals of a conventional, generic distribution panel, a controller interface located on or within the module housing and couplable to a controller, and a sensor located within the module housing and coupled to the controller interface and configured to produce a signal to the controller, that determines that a minimum or maximum threshold voltage or current of a source/load coupled to the pluggable power management module has been reached based on the signal.

20 Claims, 5 Drawing Sheets

PLUGGABLE POWER MANAGEMENT MODULE FOR A POWER DISTRIBUTION PANEL

TECHNICAL FIELD

This application is directed, in general, to a pluggable power management module that is cooperable with a power distribution panel.

BACKGROUND

Conventionally, a telecommunication or other DC-based power plant and data centers often employ multiple AC or DC power sources to provide a regulated DC voltage to a load. AC power sources use rectifiers to convert their AC output voltages to a regulated DC output, and DC power sources use DC-DC converters to adjust their voltages to a regulated DC output. A DC bus aggregates the DC outputs, allowing them to power the load.

A DC distribution panel is typically employed with a central controller to control the rectifiers and converters to allocate the load among the multiple power sources. Sometimes a single power source bears the load, but more often multiple power sources share the load to some extent. Various techniques have been devised to achieve load sharing and shedding among multiple power sources.

The DC distribution panel may include shunts and battery contactors that are built directly into the frame of the DC distribution panel, and may further include circuit breakers or fuses that function to protect the system from shorts and power surges. The shunt can function as a current monitor for a load or the batteries in those instances where certain voltage value is obtained. For example, if AC power is lost, the power system switches to the back-up DC battery power. However, if a battery drains to a certain voltage value, the shunt measures this drain as well as the respective DC bus voltage and generates a signal that is read by a controller, which disconnects the over-drained battery from the system to prevent damage to the battery.

SUMMARY

One aspect provides a pluggable power management module, comprising a module housing having input and output pluggable connectors extending therefrom configured to be couplable to a corresponding input and output terminals of a distribution panel, a controller interface located on or within the module housing and couplable to a controller, and a sensor located within the module housing and coupled to the controller interface and configured to produce a signal to the controller, that determines that a minimum or maximum threshold voltage or current of a source/load coupled to the pluggable power management module has been reached based on the signal.

Another embodiment provides a power management system, comprising a distribution panel having a plurality of input/output terminals located thereon and wherein at least a portion of the input/output terminals are connected to a source/load, and a power management controller. The power management controller includes a pluggable power management module, comprising a module housing having input and output pluggable connectors extending therefrom configured to be couplable to corresponding ones of the input and output terminals, a controller interface located on or within the module housing and coupled to the controller, and a sensor located within the module housing and coupled to the controller interface and configured to produce a signal to the controller that determines that a minimum or maximum threshold voltage or current threshold voltage has been reached based on the signal.

In another aspect, there is provided a method of manufacturing a pluggable power management module. The method of this embodiment comprises forming a module housing having input and output pluggable connectors extending therefrom configured to be couplable to a corresponding input and output terminals of a distribution panel, locating a controller interface on or within the module housing that is couplable to a controller, and locating a sensor within the module housing and coupling the sensor to the controller interface, the sensor configured to produce a signal to the controller that determines that a minimum or maximum threshold voltage or current threshold has been reached based on the signal.

BRIEF DESCRIPTION

Reference is now made to the following descriptions taken in conjunction with the accompanying drawings, in which.

DETAILED DESCRIPTION

This disclosure presents a pluggable power management module that provides advantages over conventional power distribution panel configurations by reducing cost and circumventing the need to maintain different inventory configurations. For example, the power management module, as representatively presented by the embodiments set forth below, provides a configuration wherein control or sensing components that are typically hard-wired into conventional distribution panels are located within a pluggable module that can easily be removed and adapted to meet a specific customer's needs.

Typically, conventional distribution panels have a load sensor or load contactor hard-wired into the panel. Depending on the needs of a particular customer, one customer may want the distribution panel to include only the load sensor, while another customer may want to have the a battery contactor (or Low Voltage Disconnect device). In some cases, a customer may want more than one sensor and contactor. In such instances, each of these configurations require the manufacturer to build and inventory each of these different configurations, which not only increases inventory, increases the complexity of the design, but also increases manufacturing costs because each of these configurations require additional wiring within the panel to make the proper electrical connection. Moreover, due to the hard-wired nature of these panels, in-field modifications become very difficult, requiring the replacement of the entire distribution panel.

However, the modularity provided herein allows a manufacture to build a generic distribution panel, while transferring the prior hard-wired functions into a modular unit that easily plugs into the distribution panel. This reduces cost in the distribution panel as well as the module. Cost is reduced since the additional copper buss-work and wiring is not required in the modular unit because it utilizes a standard, generic bus bar and connector interfaces already present in the distribution panel which is now also less complex and lower in cost. Moreover, since the functionality is contained within a smaller, modular unit, this allows the manufacture to address the customer's individual needs without manufacturing a completely different distribution panel each time. In addition, the modularity allows for quick and easy functional modifications of the distribution panel by simply changing or adding additional distribution positions or modules. Additionally, since these components can be included in a removable module and need not be hard-wired into the distribution panel, there is more space available for other components along the distribution panel.

Figure 1A:
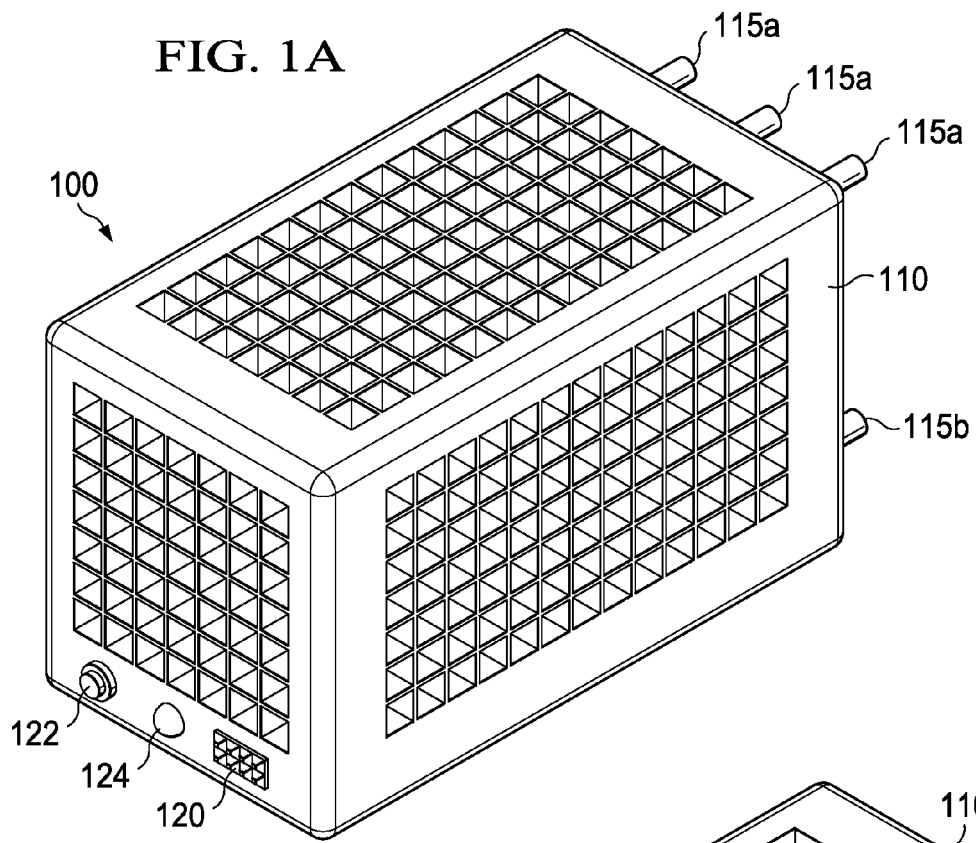
FIGS. 1A-1C are perspective views of a pluggable power management module.
Figure 1B:
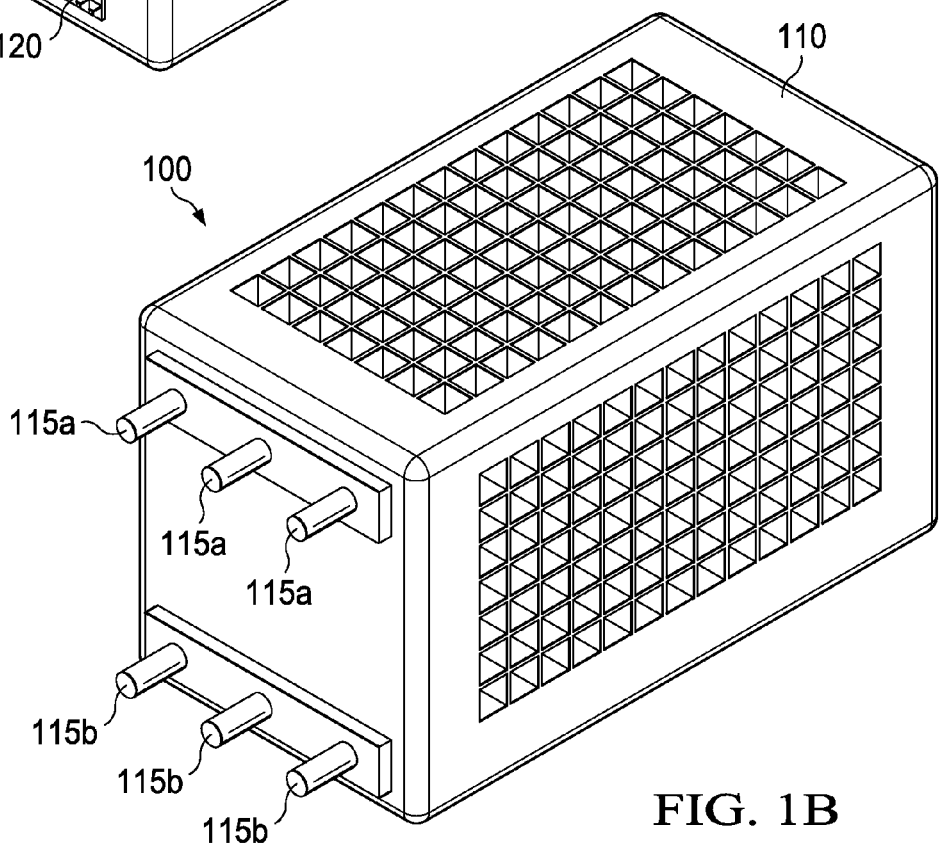
Figure 1C:
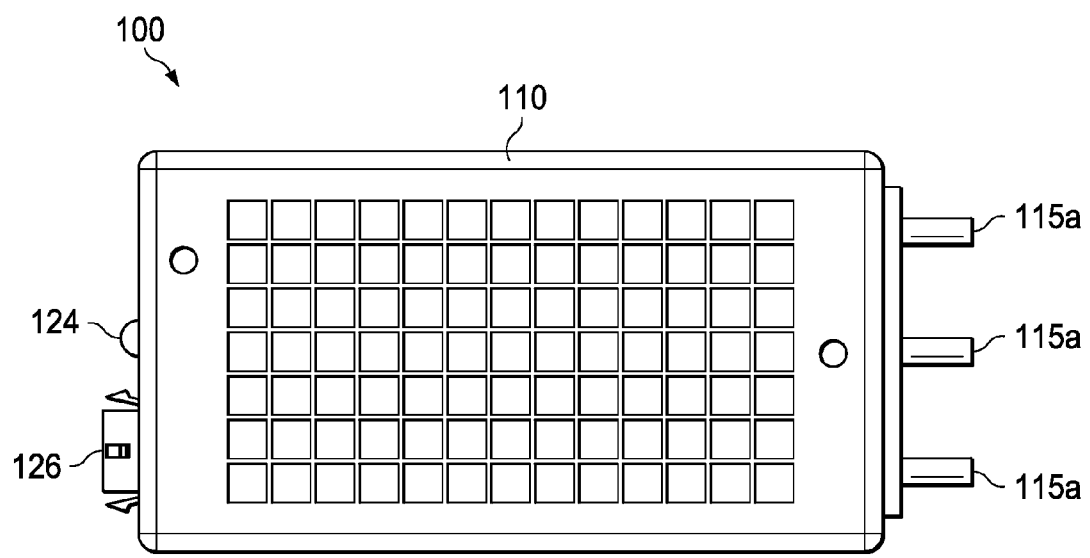

FIGS. 1A-1C illustrate different views of an embodiment of a pluggable power management module 100. FIG. 1A illustrates a perspective front view of the module 100. As seen in this view, the module 100 includes a module housing 110. Located on a back side of the module housing 110 are at least one pair of electrical input/output connectors 115a, 115b, which are only partially shown in this view. The front end of the module 100 may include optional module status indicators lights 120, an optional recessed contactor or switch disconnect button 122, and an optional indicator light 124 that can be configured to indicate the operating state of the contactor.

FIG. 1B illustrates a rear or back view of the module 100. In this particular view, all of the electrical input connectors 115a and output connectors 115b can be seen. The connectors 115a, 115b are configured to be couplable to corresponding input and output terminals of a conventional distribution panel. Conventional distribution panels often employ the use of terminals that are used to receive "bullet-type" connectors, i.e., connectors that have a general shape of a bullet. Thus, the connectors 115a, 115b may be a well known type of bullet connector. It should be noted that though three pair of electrical input/output connectors 115a, 115b are shown, the module 100 may include any number of such connectors. For example, it may have only one pair of such connectors or more than the three pair that are shown. The number of connectors 115a, 115b will depend on the number of electrical components, size of the load, or the number of loads connected to and monitored by the module 100.

FIG. 1C illustrates an overhead view of the module 100 that illustrates a controller interface 126 located on or within the module housing 110 that is couplable to a controller, not shown. In this particular embodiment, the controller interface 126 is located on the outside of the module housing 110. However, in other embodiments, the controller interface 126 may be located within the module housing 110 and may be couplable to a controller by way of one or more pair of connectors 115a, 115b. In the illustrated embodiment, the controller interface 126 may be configured to receive a connector end of an integrated smart-card that could be used to control the intended monitoring and switching functions of the power management module 100. In an alternative embodiment, the controller interface 126 may be connected to a controller cable, thereby coupling it to a remote controller. Thus, the pluggable power management module 100 provides a module that can easily be changed internally and plugged into a power distribution panel in a modular fashion, thereby addressing the problems associated with conventional power distribution panels.

The pluggable power management module 100 is different from conventional circuit breakers or fuses that are also often plugged into the distribution panel in that the conventional circuit breakers or fuses are passive devices, whereas the module 100 is an active device. That is, the module 100 has a controller interface that allows integrated or remote management of the device. Information both at the local pluggable power management module level and information at a system level are used to manage said component. Command signals are sent by the controller or integrated smart component to the module 100. In addition, with the combination of the integrated smart card and a connection to the controller, the unit can have autonomous backup disconnect and reconnect function in the event of a system controller failure or loss of communication to module 100.

Figure 2:
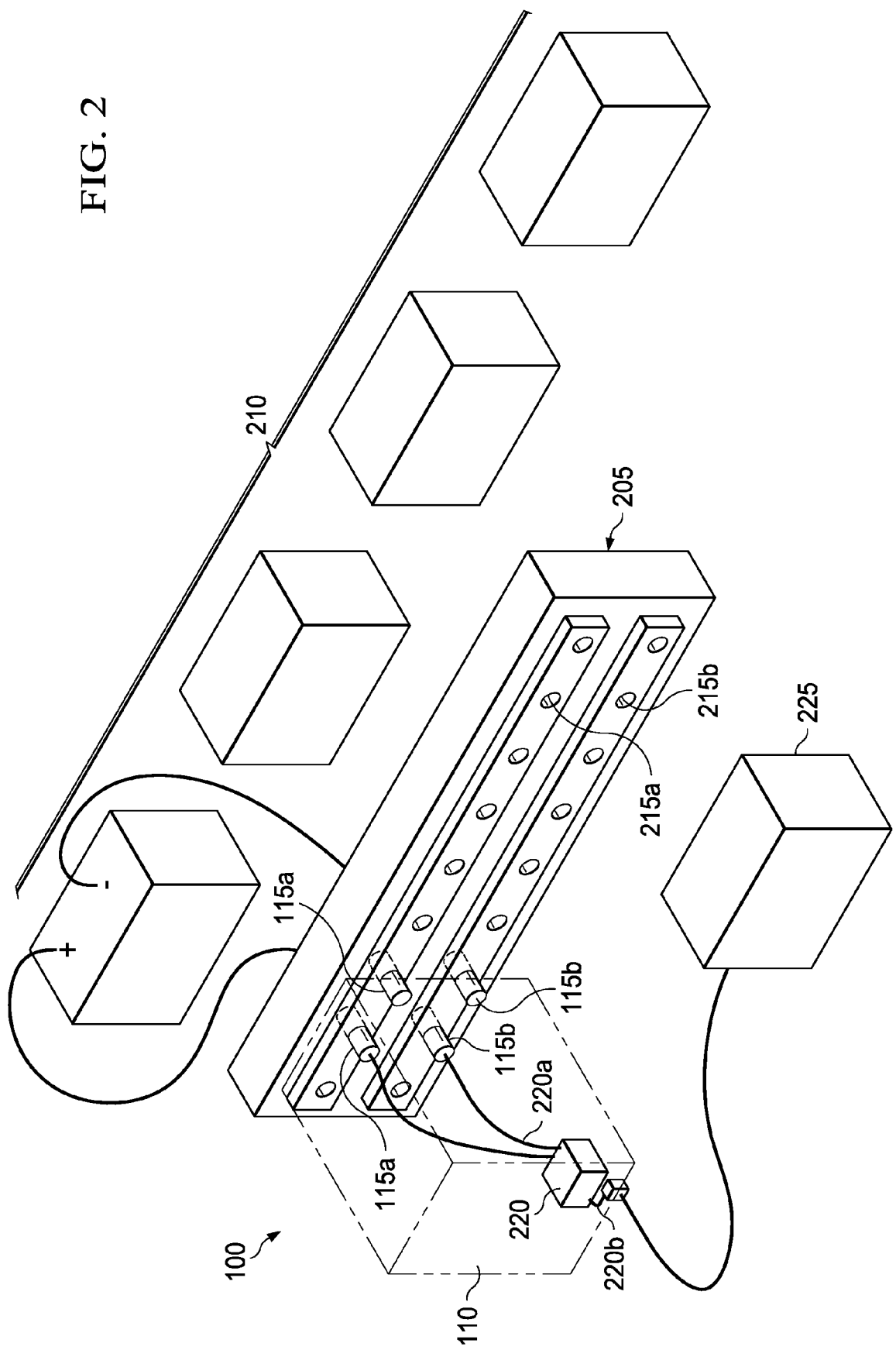
FIG. 2 illustrates one embodiment of the module of FIGS. 1A-1C interfaced with a power distribution panel.

FIG. 2 illustrates a power management system 200. In this embodiment, the power management system 200 includes a power distribution panel 205, a source/load 210 coupled to the power distribution panel 205, and one configuration of the pluggable power management module 100. The panel 205 may have an overall conventional design, however, unlike many such panels, panel 205 may not include a source or load (source/load) sensor or battery or load (battery/load) contactor hard-wired into the frame of the panel 205. The panel 205 also includes one or more pair of electrical inputs 215a and outputs 215b that are wired to a bus bar, not shown, and may be configured to receive a male connector 115a, 115b associated with the module 100.

The interior of one embodiment of the module 100 is shown, wherein at least one sensor 220 is located within the module housing 110. Though one sensor 220 is shown, it should be understood that the module 100 may include multiple sensors 220. In one embodiment, the sensor 220 is configured to sense a voltage or current of the source/load 210. In one aspect, the sensor 220 may be a conventional electrical shunt, such as an ohmage precision resistor, that has an input 220a electrically connected to the input 115a and output 115b connectors and an output 220b electrically connected to an external controller 225, such as an appropriately conventional programmed computer or a conventional smart card.

The source/load 210 may be one or more batteries or another electrical component whose voltage or current needs to be monitored. In many applications, it is often important to monitor each electrical component of the load to insure that it does not drop below a specified minimum threshold voltage to avoid damage to the component. In such applications, the sensor 220 constantly senses the voltage on the source/load 210 and sends signals to the controller 225, and when the minimum threshold voltage is reached or the voltage begins to roll off, the controller 225 is programmed to send a signal to the component of the source/load 210 whose voltage has reached the minimum threshold voltage, and it drops that particular component, by way of a switch, from the source/load 210 to prevent damage to that component. In one embodiment, the source/load 210 may be one or more batteries and in another embodiment, the source/load 210 may be electrical components, or the source/load 210 may be a combination of these. It should be noted that the electrical connections between the various components is only schematically shown, but those skilled in the art would understand how to connect the components together in an operative fashion.

Figure 3:
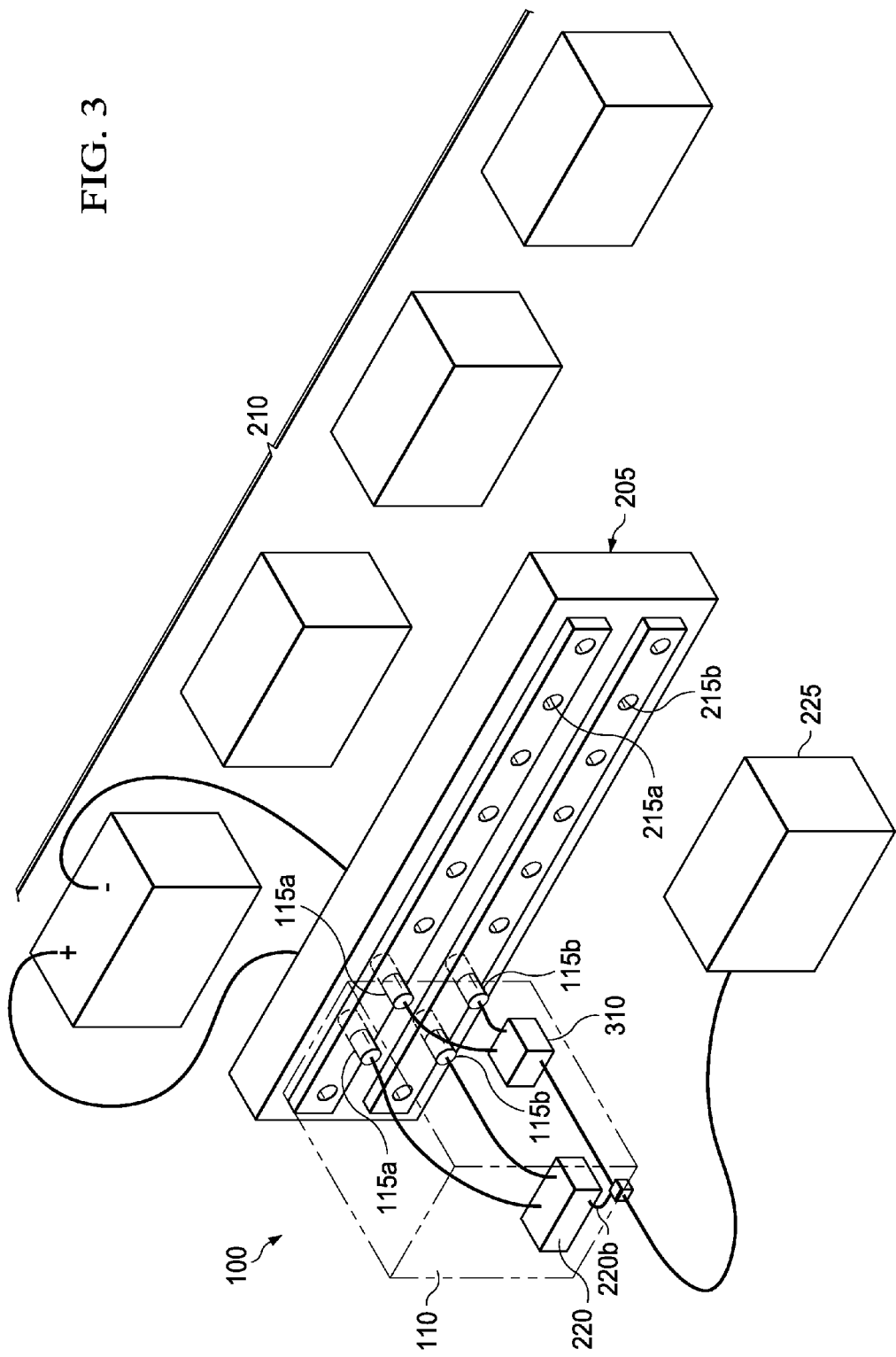
FIG. 3 illustrates another embodiment of the module of FIGS. 1A-1C interfaced with a power distribution panel.

FIG. 3 illustrates another embodiment that includes the configuration of FIG. 2, but also includes a disconnect contactor device 310 located within the module housing 110. The battery/load contactor 310 may be of conventional design and electrically coupled to the controller 225, such that when a signal is received from the controller 225, the battery/load contactor 310 serves as a switch to disconnect one or more batteries/loads from the source/load 210 when a minimum threshold voltage is reached. In one embodiment, the battery/ load contactor 310 is coupled to the battery or batteries (load or loads) by an input 215a and an output 215b. As with the previous embodiment, the sensor 220 continually senses the voltage of the source/load 210, which in this case may be one or more batteries or loads. When the controller 225 reads a signal from the sensor 220 that the minimum threshold voltage has been reached, it sends a low voltage disconnect signal to the battery/load contactor 310, which then disconnects that battery or batteries (load or loads) from the source/load 210. Disconnect functions can also be based upon temperature measurements, current measurements, or any combination of the mentioned.

Figure 4:
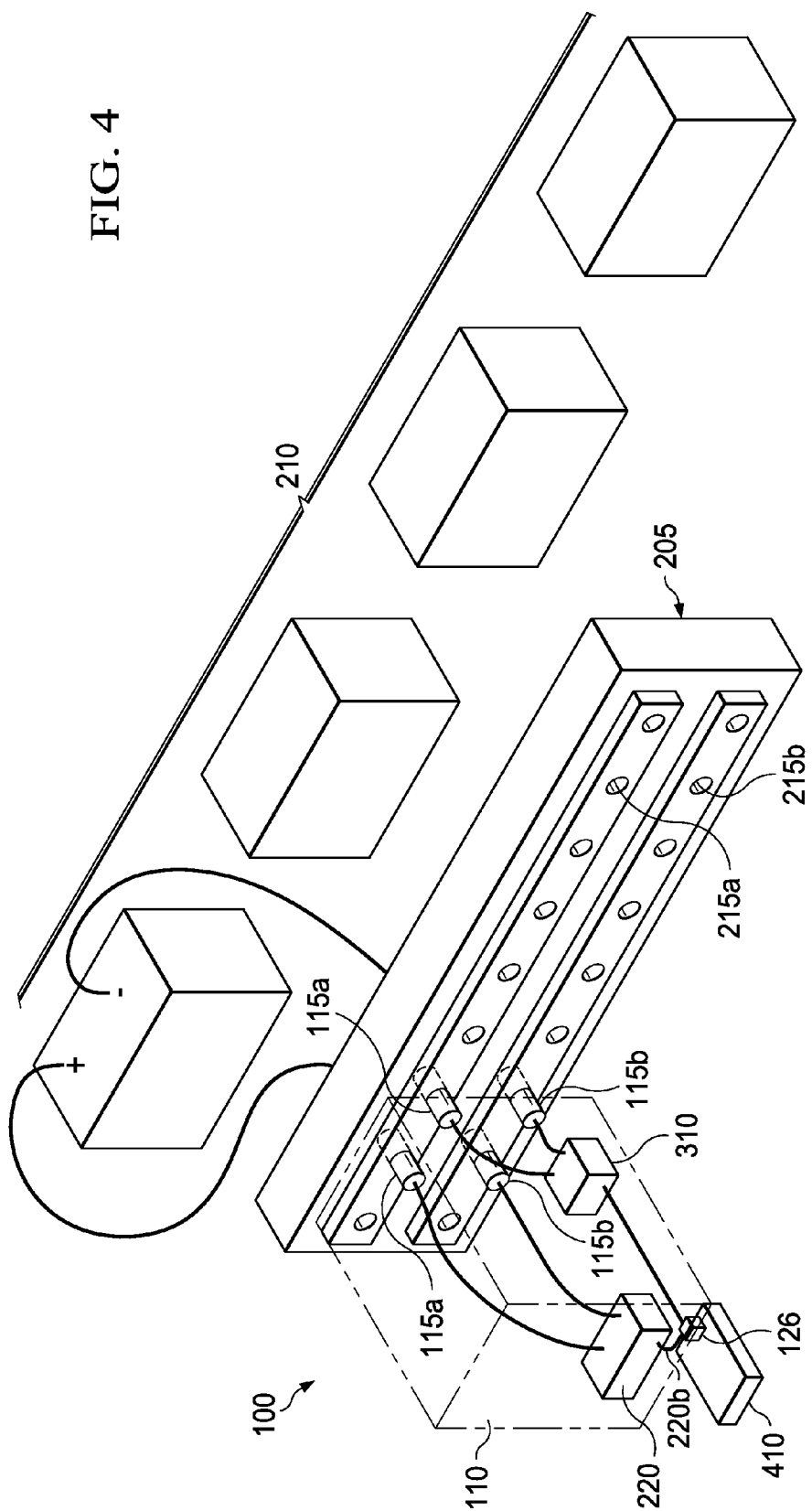
FIG. 4 illustrates another embodiment of the module of FIGS. 1A-1C interfaced with a power distribution panel.

FIG. 4 illustrates another embodiment of the pluggable power management module 100 wherein the controller is a smart card controller 410 that is connected either directly connected to a controller interface located on an exterior wall of the module housing 110 or a smart card controller that may be located within the housing 110. In the illustrated embodiment, the smart card controller 410 is connected to the module 100 by way of the controller interface 126. The smart card controller 410 may be of conventional designed and programmed in the same way as the controller of previously discussed embodiments.

Those skilled in the art to which this application relates will appreciate that other and further additions, deletions, substitutions and modifications may be made to the described embodiments.

What is claimed is:

1. A pluggable power management module, comprising:
   a module housing having input and output pluggable connectors extending therefrom configured to be couplable to a corresponding input and output terminals of a distribution panel;
   a controller interface located on or within the module housing and couplable to a controller; and
   a sensor located within the module housing and coupled to the controller interface and configured to produce a signal to the controller that determines that a minimum or maximum threshold voltage or current has been reached based on the signal.

2. The module recited in claim 1, wherein the sensor is a current sensor.

3. The module recited in claim 1, wherein the sensor includes a battery contactor switch located within the module housing and coupled to the controller interface, the battery contactor operable to remove a load off or attach a load onto the distribution panel upon receiving a signal from a controller.

4. The module recited in claim 1, wherein the module includes at least one set of input/output 100 amp pluggable connectors.

5. The module recited in claim 1, further including a controller.

6. The module recited in claim 5, wherein the controller is located within the module housing and coupled to the controller interface.

7. The module recited in claim 1, wherein the housing module further includes an external controller interface configured to receive a connector for a controller.

8. A power management system, comprising:
   a distribution panel having a plurality of input/output terminals located thereon and wherein at least a portion of the input/output terminals are connected to a source/load;
   a power management controller; and
   a pluggable power management module, comprising:
      a module housing having input and output pluggable connectors extending therefrom configured to be couplable to corresponding ones of the input and output terminals;
      a controller interface located on or within the module housing and coupled to the controller; and
      a sensor located within the module housing and coupled to the controller interface and configured to produce a signal to the controller that determines that a minimum or maximum threshold voltage or current of the source/load has been reached based on the signal.

9. The system recited in claim 8, wherein the sensor is a current sensor.

10. The system recited in claim 8, wherein the source/load is at least one battery/load and the power management system further includes a battery/load contactor switch located within the module housing and coupled to the controller interface, the battery/load contactor operable to remove a battery/load from the source/load upon receiving a signal from the controller.

11. The system recited in claim 8, wherein the module includes at least one set of input/output 100 amp pluggable connectors.

12. The system recited in claim 8, wherein the load is a change in voltage of a load on the distribution panel.

13. The system recited in claim 8, wherein the controller is located within the module housing and coupled to the controller interface.

14. The system recited in claim 8, wherein the housing module further includes an external controller interface configured to receive a connector of the controller.

15. A method of manufacturing a pluggable power management module, comprising:
   forming a module housing having input and output pluggable connectors extending therefrom configured to be couplable to a corresponding input and output terminals of a distribution panel;
   locating a controller interface on or within the module housing that is couplable to a controller; and
   locating a sensor within the module housing and coupling the sensor to the controller interface, the sensor configured to produce a signal to the controller that determines that a minimum or maximum threshold voltage or current has been reached based on the signal.

16. The method recited in claim 15, wherein the sensor is a current sensor.

17. The method recited in claim 15, locating the sensor includes locating a battery contactor switch within the module housing and coupling the battery contactor to the controller interface, the battery contactor operable to remove a load of the distribution panel upon receiving a signal from a controller.

18. The method recited in claim 15, wherein the module includes at least one set of input/output 100 amp pluggable connectors.

19. The method recited in claim 15, further including connecting a controller to the controller interface.

20. The method recited in claim 19, wherein connecting the controller includes placing the controller within the module housing.

* * * * *